US008948800B2

(12) United States Patent
Amin et al.

(10) Patent No.: US 8,948,800 B2
(45) Date of Patent: Feb. 3, 2015

(54) SYSTEMS, APPARATUSES, AND METHODS TO FACILITATE COORDINATED SCHEDULING IN WIRELESS COMMUNICATION SYSTEMS

(75) Inventors: Muhammad Awais Amin, Nuremberg (DE); Jochen U. Giese, Nuremberg (DE); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/046,091

(22) Filed: Mar. 11, 2011

(65) Prior Publication Data

US 2011/0244906 A1 Oct. 6, 2011

Related U.S. Application Data

(60) Provisional application No. 61/319,097, filed on Mar. 30, 2010, provisional application No. 61/319,105, filed on Mar. 30, 2010, provisional application No. 61/319,112, filed on Mar. 30, 2010.

(51) Int. Cl.
*H04B 7/24* (2006.01)
*H04B 7/02* (2006.01)
*H04W 72/04* (2009.01)

(52) U.S. Cl.
CPC ........... *H04B 7/024* (2013.01); *H04W 72/0413* (2013.01); *H04W 72/046* (2013.01)
USPC ............................. 455/507; 455/403; 455/561

(58) Field of Classification Search
CPC .................................................. H04W 88/00
USPC .......................................... 455/509; 370/338
See application file for complete search history.

(56) References Cited

U.S. PATENT DOCUMENTS 7,787,531 B2 * 8/2010 Porter et al. ................... 375/229
8,036,099 B2 * 10/2011 Zangi et al. ................... 370/208
(Continued)

FOREIGN PATENT DOCUMENTS

CN 101578774 A 11/2009
JP 2011508576 A 3/2011
(Continued)

OTHER PUBLICATIONS

Alcatel-Lucent et al: "Consideration on performance of coordinated beamforming with PMI feedback", 3GPP Draft; R1-094615 CONSID_OF_PERF_COBF_WITH_PMI_FEE DB5, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389024, [retrieved on Nov. 2, 2009].
(Continued)

*Primary Examiner* — Hai V Nguyen
(74) *Attorney, Agent, or Firm* — Paul Kuo

(57) ABSTRACT

A system and method of coordinating scheduling in a wireless communication system are described herein. In one aspect, cells receive information regarding one or more precoding matrices from user equipments. The information may include a request from an user equipment that the cell not use a particular precoding matrix for communications. The cell may determine whether restricting usage of the precoding matrix for communication improves overall communication in the wireless communication system by performing pairwise comparisons of utility based on usage and restriction of the precoding matrix. The cell may further resolve conflicts that arise between several cells based on the granting of restriction of the precoding matrix.

32 Claims, 8 Drawing Sheets

(56) References Cited

U.S. PATENT DOCUMENTS

| | | | | |
|---|---|---|---|---|
| 8,135,083 | B2* | 3/2012 | Khojastepour et al. | 375/267 |
| 8,140,019 | B2* | 3/2012 | Kim et al. | 455/63.1 |
| 8,165,035 | B2* | 4/2012 | Che et al. | 370/252 |
| 8,179,775 | B2* | 5/2012 | Chen et al. | 370/203 |
| 8,179,819 | B2* | 5/2012 | Kim et al. | 370/254 |
| 8,190,094 | B2* | 5/2012 | Kim et al. | 455/63.1 |
| 8,238,954 | B2* | 8/2012 | Liu et al. | 455/501 |
| 8,249,511 | B2* | 8/2012 | Liu et al. | 455/63.1 |
| 8,275,060 | B2* | 9/2012 | Chen et al. | 375/260 |
| 8,301,182 | B2* | 10/2012 | Kim et al. | 455/509 |
| 8,306,042 | B1* | 11/2012 | Abts | 370/401 |
| 8,325,860 | B2* | 12/2012 | Gomadam et al. | 375/346 |
| 8,355,367 | B2* | 1/2013 | Han et al. | 370/328 |
| 8,369,788 | B2* | 2/2013 | Kim et al. | 455/63.1 |
| 8,374,160 | B2* | 2/2013 | Ihm et al. | 370/338 |
| 8,401,480 | B2* | 3/2013 | Koo et al. | 455/63.1 |
| 8,467,469 | B2* | 6/2013 | Lee et al. | 375/267 |
| 8,472,547 | B2* | 6/2013 | Hammarwall et al. | 375/267 |
| 8,472,550 | B2* | 6/2013 | Koike-Akino et al. | 375/285 |
| 8,488,480 | B2* | 7/2013 | Han et al. | 370/252 |
| 8,537,879 | B2* | 9/2013 | Vitthaladevuni et al. | 375/146 |
| 8,554,241 | B2* | 10/2013 | Lim et al. | 455/452.2 |
| 8,626,070 | B2* | 1/2014 | Lee et al. | 455/63.1 |
| 8,649,344 | B2* | 2/2014 | Xu et al. | 370/329 |
| 8,687,678 | B2* | 4/2014 | Hammarwall et al. | 375/219 |
| 8,688,105 | B2* | 4/2014 | Koo et al. | 455/422.1 |
| 8,699,602 | B2* | 4/2014 | Chen et al. | 375/267 |
| 8,705,404 | B2* | 4/2014 | Kim et al. | 370/254 |
| 8,706,040 | B2* | 4/2014 | Lim et al. | 455/63.1 |
| 8,718,665 | B2* | 5/2014 | Kim et al. | 455/452.2 |
| 8,724,543 | B2* | 5/2014 | Jongren et al. | 370/329 |
| 8,731,480 | B2* | 5/2014 | Kim et al. | 455/69 |
| 8,787,482 | B2* | 7/2014 | Jiao et al. | 375/267 |
| 2008/0117833 | A1 | 5/2008 | Borran et al. | |
| 2008/0212550 | A1* | 9/2008 | Han et al. | 370/342 |
| 2008/0247364 | A1* | 10/2008 | Kim et al. | 370/336 |
| 2008/0260059 | A1* | 10/2008 | Pan | 375/260 |
| 2009/0046569 | A1* | 2/2009 | Chen et al. | 370/203 |
| 2009/0097443 | A1* | 4/2009 | Pasanen et al. | 370/329 |
| 2009/0181708 | A1* | 7/2009 | Kim et al. | 455/501 |
| 2009/0197538 | A1* | 8/2009 | Borran et al. | 455/63.1 |
| 2009/0201825 | A1* | 8/2009 | Shen et al. | 370/252 |
| 2009/0203323 | A1* | 8/2009 | Ratasuk et al. | 455/68 |
| 2009/0207822 | A1* | 8/2009 | Kim et al. | 370/338 |
| 2009/0215480 | A1* | 8/2009 | Kim et al. | 455/501 |
| 2010/0035555 | A1 | 2/2010 | Bala et al. | |
| 2010/0039990 | A1* | 2/2010 | Jongren et al. | 370/328 |
| 2010/0048233 | A1* | 2/2010 | Kim et al. | 455/501 |
| 2010/0136994 | A1* | 6/2010 | Kim et al. | 455/450 |
| 2010/0215110 | A1* | 8/2010 | Onggosanusi et al. | 375/260 |
| 2010/0238889 | A1* | 9/2010 | Kim et al. | 370/329 |
| 2011/0021153 | A1* | 1/2011 | Safavi | 455/63.1 |
| 2011/0034192 | A1* | 2/2011 | Lim et al. | 455/501 |
| 2011/0038436 | A1* | 2/2011 | Kim et al. | 375/260 |
| 2011/0039547 | A1 | 2/2011 | Van Rensburg et al. | |
| 2011/0039568 | A1* | 2/2011 | Zhang et al. | 455/452.1 |
| 2011/0105164 | A1* | 5/2011 | Lim et al. | 455/501 |
| 2011/0116563 | A1* | 5/2011 | Vitthaladevuni et al. | 375/260 |
| 2011/0194593 | A1 | 8/2011 | Geirhofer et al. | |
| 2011/0216817 | A1* | 9/2011 | Kim et al. | 375/224 |
| 2011/0216846 | A1* | 9/2011 | Lee et al. | 375/295 |
| 2011/0217971 | A1* | 9/2011 | Kim et al. | 455/422.1 |
| 2011/0243004 | A1* | 10/2011 | Giese et al. | 370/252 |
| 2011/0243079 | A1* | 10/2011 | Chen et al. | 370/329 |
| 2011/0249637 | A1* | 10/2011 | Hammarwall et al. | 370/329 |
| 2011/0249712 | A1* | 10/2011 | Hammarwall et al. | 375/220 |
| 2011/0249713 | A1* | 10/2011 | Hammarwall et al. | 375/220 |
| 2011/0268068 | A1* | 11/2011 | Jian et al. | 370/329 |
| 2011/0274200 | A1* | 11/2011 | Lee et al. | 375/295 |
| 2011/0305287 | A1* | 12/2011 | Kwon et al. | 375/260 |
| 2012/0063494 | A1* | 3/2012 | Frenne et al. | 375/219 |
| 2012/0106450 | A1* | 5/2012 | Golitschek Edler Von Elbwart et al. | 370/328 |
| 2012/0176982 | A1* | 7/2012 | Zirwas et al. | 370/329 |
| 2012/0201191 | A1* | 8/2012 | Seo et al. | 370/315 |
| 2012/0230231 | A1* | 9/2012 | Lim et al. | 370/280 |
| 2013/0258970 | A1* | 10/2013 | Kim et al. | 370/329 |
| 2013/0303217 | A1 | 11/2013 | Tao | |
| 2014/0120937 | A1* | 5/2014 | Lee et al. | 455/452.2 |

FOREIGN PATENT DOCUMENTS

| | | | |
|---|---|---|---|
| JP | 2011509571 A | 3/2011 | |
| JP | 2011518478 A | 6/2011 | |
| WO | 2009084921 A2 | 7/2009 | |
| WO | WO-2009120048 A2 | 10/2009 | |
| WO | WO 2010053265 A2 * | 5/2010 | H04B 7/06 |

OTHER PUBLICATIONS

CHTTL: "Discussions on CoMP Cooperating Set", 3GPP Draft; R1-092833, 3rd Generation Partnership Project (3GPP), Mobile Competence Centre; 650, Route Des Lucioles; F-06921 Sophia-Antipolis Cedex; France, No. Los Angeles, USA; Jun. 26, 2009, XP050351276, [retrieved on Jun. 26, 2009].

International Search Report and Written Opinion—PCT/US2011/030375—ISA/EPO—Jun. 8, 2011.

Jochen Giese et al: "Performance upper bounds for coordinated beam selection in LTE-Advanced", Smart Antennas (WSA), 2010 International ITG Workshop on, IEEE, Piscataway, NJ, USA, Feb. 23, 2010, pp. 280-285, XP031663692,ISFJN: 978-1-4244-6070-0.

Laetitia Falc0netti et al.,"Codebook based Inter-Cell Interference Coordination for LTE", Personal Indoor and Mobile Radio Communications (PIMRC), 2010 IEEE 21st International Symposium on, IEEE, Piscataway, NJ, USA, Sep. 26, 2010, pp. 1769-1774, XP031838171, ISBN: 978-1-4244-8017-3.

LG Electronics: "Feedback information for downlink coordinated scheduli ng/beamforming", 3GPP Draft; R1-094792 LGE_FEED-BACK_CB, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389188, [retrieved on Nov. 3, 2009].

Samsung: "Inter-Cell Interference Mitigation Through Limited Coordination", 3GPP Draft; R1-082886 Inter-Cell Interference Mitigation Through Limited Coordination, 3rd Generation Partnership Project (3GPP), Mobile Competence Centre 650, Route Des Lucioles; F-06921 Sophia-Antipolis Cedex; France, No. Jeju; 20080812, Aug. 12, 2008, XP050316366, [retrieved on Aug. 12, 2008].

* cited by examiner

SYSTEMS, APPARATUSES, AND METHODS TO FACILITATE COORDINATED SCHEDULING IN WIRELESS COMMUNICATION SYSTEMS

CLAIM OF PRIORITY

This application claims the benefit of U.S. Provisional Application No. 61/319,097, filed Mar. 30, 2010; U.S. Provisional Application No. 61/319,105, filed Mar. 30, 2010; and U.S. Provisional Application No. 61/319,112, filed Mar. 30, 2010, the entire contents of each of which are incorporated herein by reference.

REFERENCE TO CO-PENDING APPLICATIONS FOR PATENT

The present application for patent is related to the following U.S. patent application. "SYSTEMS, APPARATUSES, AND METHODS TO FACILITATE COORDINATED SCHEDULING IN WIRELESS COMMUNICATION SYSTEMS" by Jochen U. Giese, Stefan Brueck, and Muhammad Awais Amin, Ser. No. 13/046,105, filed concurrently herewith, assigned to the assignee hereof, and expressly incorporated by reference herein.

BACKGROUND

1. Field

The present application relates generally to wireless communication, and more specifically to systems and methods for coordinating the use of pre-coding matrices between wireless devices to reduce interference.

2. Background

The popularity of high-rate wireless data services is increasing the demand for access to the available frequency spectrum. The ability to satisfy demand is often limited by a lack of available frequency spectrum that may be used for reliable communications within a geographic area. Improvements in spectral efficiency may contribute to improved network capacity, thereby allowing more subscribers access to the available frequency spectrum. Additionally and/or alternatively, improvements in spectral efficiency may contribute to an overall improvement in data rates within an allocated band in order to offer subscribers a better experience and ensuing perceived quality-of-service (QoS) when utilizing high-rate wireless data services.

Towards the aim of improving spectral efficiency, a group of techniques known as Coordinated Multipoint (CoMP) transmission techniques has been proposed for Long Term Evolution Advanced (LTE-Advanced). One such CoMP technique involves access points (e.g. base stations and the like) coordinating scheduling decisions. Coordinated scheduling may result in reduced interference, especially for cell-edge user devices, which are typically subject to strong inter-cell interference from one or more non-serving access points. Reducing interference may contribute to an improvement in data throughputs for some user devices. However, conventional wireless systems are not configured to exchange the type of information or make the types of determinations associated with coordinated scheduling.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing interference of beamformed communication signals by employing scheduling of available pre-coding matrices.

One embodiment of the disclosure provides a method of coordinated scheduling in a wireless communication system. The method comprises receiving information regarding a set of one or more precoding matrices. The method further comprises determining a first utility value for a first set of wireless devices served by a first access point based on restriction of the set of one or more precoding matrices. The method further comprises determining a second utility value for a second set of wireless devices served by a second access point based on use of the set of one or more precoding matrices. The method further comprises comparing the first utility value to the second utility value. The method further comprises granting restriction of use of the set of one or more precoding matrices by the first access point based on the comparison. The method further comprises identifying a conflict with a third access point based on the granting restriction of use of the precoding matrix by the first access point. The method further comprises resolving the conflict by evaluating utility values for the first access point, the second access point, and the third access point.

Another embodiment of the disclosure provides a first access point for coordinated scheduling in a wireless communication system. The first access point comprises a receiver configured to receive information regarding a set of one or more precoding matrices. The first access point further comprises a processor. The processor is configured to determine a first utility value for a first set of wireless devices served by the first access point based on restriction of the set of one or more precoding matrices. The processor is further configured to determine a second utility value for a second set of wireless devices served by a second access point based on use of the set of one or more precoding matrices. The processor is further configured to compare the first utility value to the second utility value. The processor is further configured to grant restriction of use of the set of one or more precoding matrices by the first access point based on the comparison. The processor is further configured to identify a conflict with a third access point based on the granting restriction of use of the precoding matrix by the first access point. The processor is further configured to resolve the conflict by evaluating utility values for the first access point, the second access point, and the third access point.

Another embodiment of the disclosure provides a first access point for coordinated scheduling in a wireless communication system. The first access point comprises means for receiving information regarding a set of one or more precoding matrices. The first access point further comprises means for determining a first utility value for a first set of wireless devices served by a first access point based on restriction of the set of one or more precoding matrices. The first access point further comprises means for determining a second utility value for a second set of wireless devices served by a second access point based on use of the set of one or more precoding matrices. The first access point further comprises means for comparing the first utility value to the second utility value. The first access point further comprises means for granting restriction of use of the set of one or more precoding matrices by the first access point based on the comparison. The first access point further comprises means for identifying a conflict with a third access point based on the granting restriction of use of the precoding matrix by the first access point. The first access point further comprises means for resolving the conflict by evaluating utility values for the first access point, the second access point, and the third access point.

Another embodiment of the disclosure provides a computer program product comprising computer-readable medium. The computer-readable medium comprises code for causing a computer to receive information regarding a set of one or more precoding matrices. The computer-readable medium further comprises code for causing a computer to determine a first utility value for a first set of wireless devices served by a first access point based on restriction of the set of one or more precoding matrices. The computer-readable medium further comprises code for causing a computer to determine a second utility value for a second set of wireless devices served by a second access point based on use of the set of one or more precoding matrices. The computer-readable medium further comprises code for causing a computer to compare the first utility value to the second utility value. The computer-readable medium further comprises code for causing a computer to grant restriction of use of the set of one or more precoding matrices by the first access point based on the comparison. The computer-readable medium further comprises code for causing a computer to identify a conflict with a third access point based on the granting restriction of use of the precoding matrix by the first access point. The computer-readable medium further comprises code for causing a computer to resolve the conflict by evaluating utility values for the first access point, the second access point, and the third access point.

Another embodiment of the disclosure provides a method of coordinated scheduling in a wireless communication system. The method comprises receiving from a user equipment an instruction to restrict use of a set of one or more precoding matrices. The method further comprises granting restriction of use of the set of one or more precoding matrices by an access point based on the instruction.

Another embodiment of the disclosure provides an access point for coordinated scheduling in a wireless communication system. The access point comprises a receiver configured to receive from a user equipment an instruction to restrict use of a set of one or more precoding matrices. The access point further comprises a processor configured to grant restriction of use of the set of one or more precoding matrices by the access point based on the instruction.

Another embodiment of the disclosure provides an access point for coordinated scheduling in a wireless communication system. The access point comprises means for receiving from a user equipment an instruction to restrict use of a set of one or more precoding matrices. The access point further comprises means for granting restriction of use of the set of one or more precoding matrices by the access point based on the instruction.

Another embodiment of the disclosure provides a computer program product comprising computer-readable medium. The computer-readable medium comprises code for causing a computer to receive from a user equipment an instruction to restrict use of a set of one or more precoding matrices. The computer-readable medium further comprises code for causing a computer to grant restriction of use of the set of one or more precoding matrices by an access point based on the instruction.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network employing a group of techniques known as Coordinated Multipoint (CoMP) transmission techniques has been proposed for Long Term Evolution Advanced (LTE-Advanced).

Figure 1:
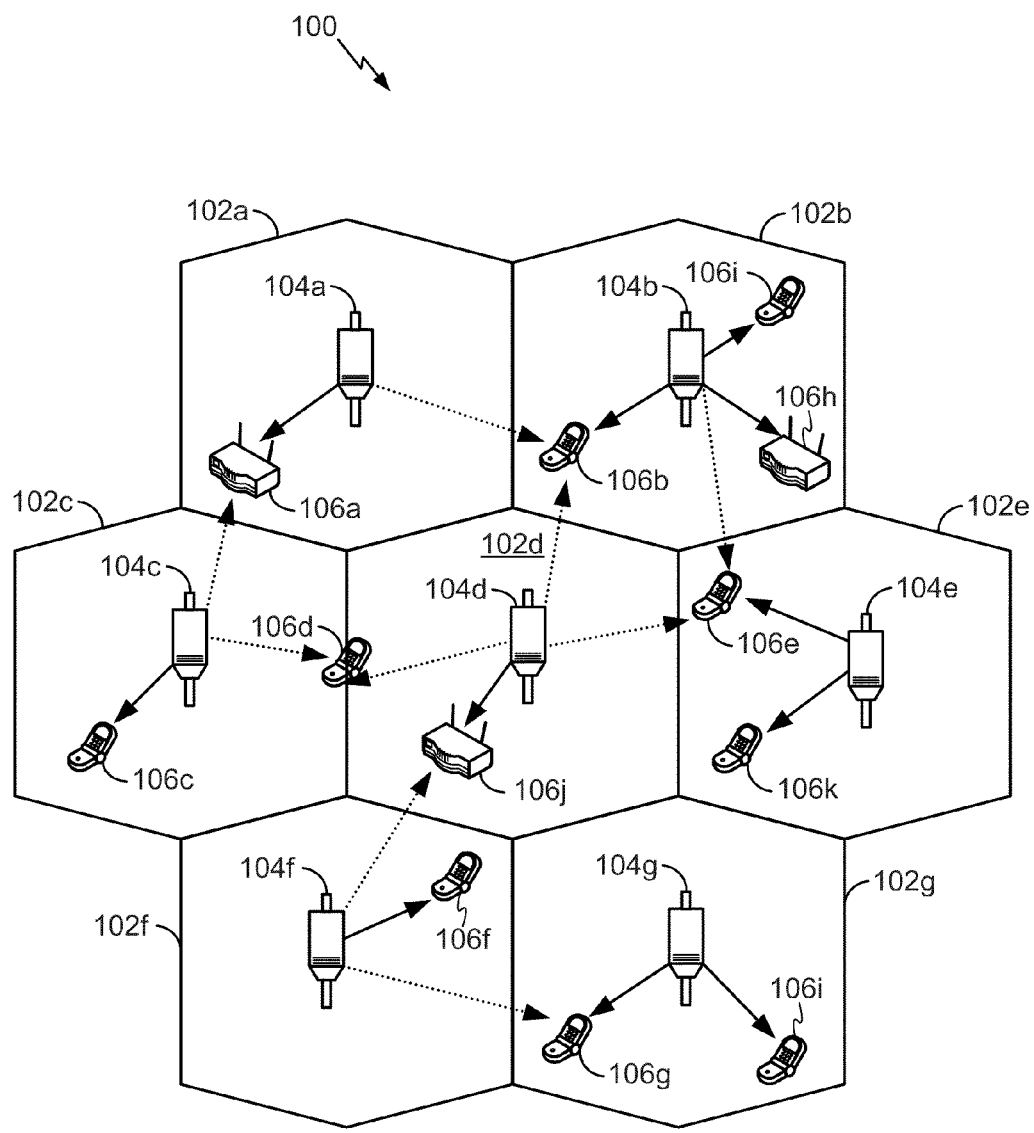
FIG. 1 illustrates an exemplary wireless communication network.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more base stations (BSs) 104 (e.g., nodes, access points, etc.), such as, for example, BSs 104a-104g. Each BS 104 may provide communication coverage to a corresponding cell 102 and may be referred to as a serving base station of that cell. The BSs 104 may interact with a plurality of user equipments (UEs), such as, for example, UEs 106a-106l. The terms "cell" and "BS" may be used interchangeably herein and refer to a physical device or a geographical region as appropriate from the context in which the term is used.

Each UE 106 may communicate with one or more BSs 104 on a forward link (FL) and/or a reverse link (RL) at a given moment. A FL is a communication link from a BS to an UE. A RL is a communication link from an UE to a BS. The FL may also be referred to as the downlink. Further, the RL may also be referred to as the uplink. The BSs 104 may be interconnected, for example, by appropriate wired or wireless interfaces and may be able to communicate with each other. Accordingly, each UE 106 may communicate with another UE 106 through one or more BSs 104. For example, the UE 106j may communicate with the UE 106h as follows. The UE 106j may communicate with the BS 104d. The BS 104d may then communicate with the BS 104b. The BS 104b may then communicate with the UE 106h. Accordingly, a communication is established between the UE 106j and the UE 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

An UE 106 may be a wireless communication device (e.g., a mobile phone, router, personal computer, server, etc.) used by a user to send and receive voice or data over a communications network. An user equipment (UE) may also be referred to herein as an access terminal (AT), as a mobile station (MS), or as a terminal device. As shown, UEs 106a, 106h, and 106j comprise routers. UEs 106b-106g, 106i, 106k, and 106l comprise mobile phones. However, each of UEs 106a-106l may comprise any suitable communication device.

A wireless multiple-access communication system may simultaneously support communication for multiple wireless UEs. As mentioned above, each UE may communicate with one or more BSs via transmissions on the forward and reverse links. The forward link (or downlink) refers to the communication link from the BS to the UE, and the reverse link (or uplink) refers to the communication link from the UE to the BS. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a BS, an UE, etc.) to extract a transmit beam-forming gain on the forward link when multiple antennas are available at the device.

The teachings herein may be incorporated into a device (e.g., a BS, an UE, etc.) employing various components for communicating with at least one other device.

Figure 2:
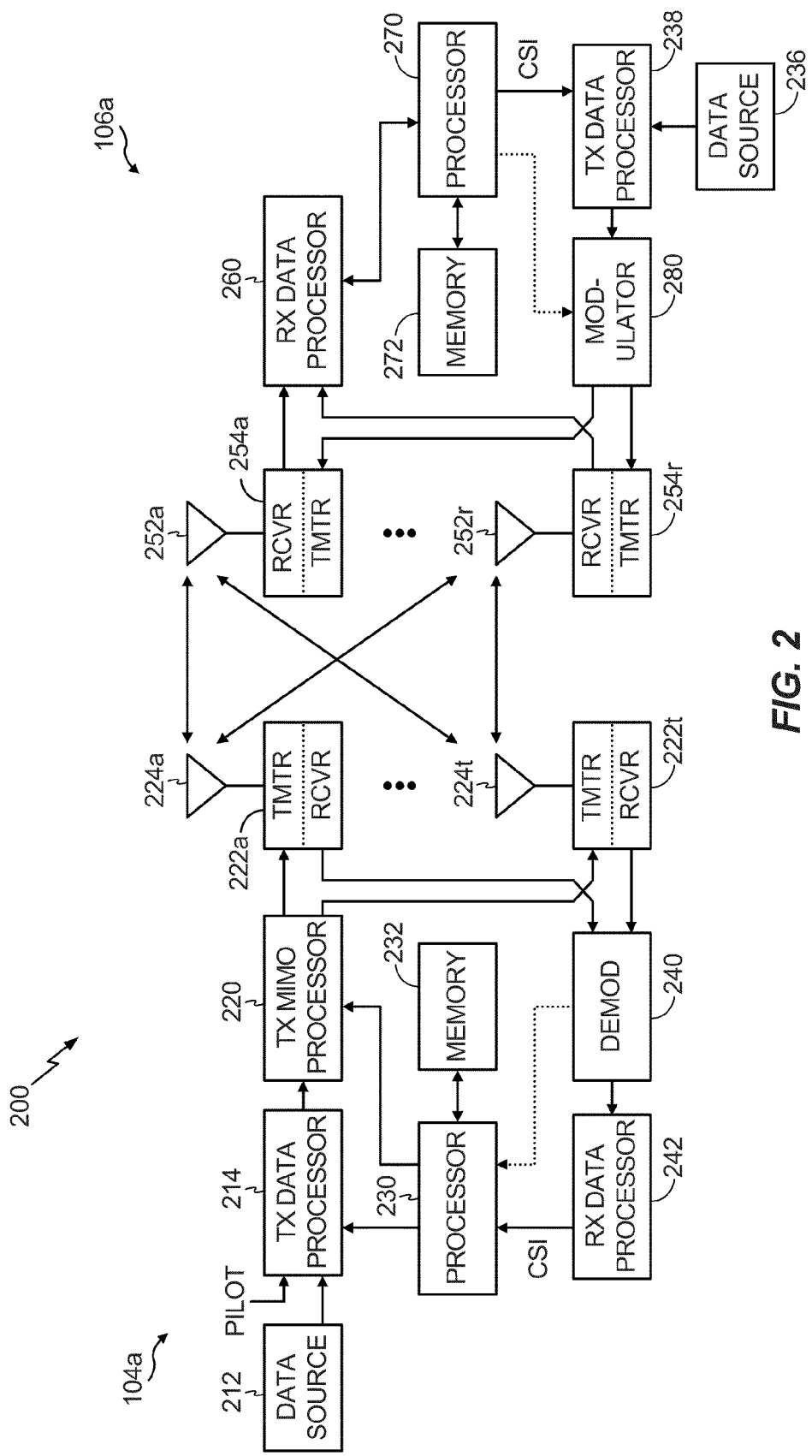
FIG. 2 illustrates functional block diagrams of an exemplary base station and an exemplary user equipment shown in FIG. 1.

FIG. 2 illustrates functional block diagrams of an exemplary BS 104a and an exemplary UE 106a shown in FIG. 1. In a MIMO system 200, the BS 104a communicates with one or more UEs such as the UE 106a. At the BS 104a, traffic data for a number of data streams is provided from a data source 212 to a transmit ("TX") data processor 214.

In one embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the BS 104a.

The modulation symbols for all data streams are then provided to a TX MIMO processor 220, which may further process the modulation symbols (e.g., for OFDM). The TX MIMO processor 220 then provides NT modulation symbol streams to NT transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 222A through 222T are then transmitted from NT antennas 224A through 224T, respectively.

At the UE 106a, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide NT "detected" symbol streams. The RX data processor 260 then demodulates, deinterleaves, and decodes each detected symbol stream to recover the traffic data for the data stream. The processing performed by the RX data processor 260 is complementary to that performed by the TX MIMO processor 220 and the TX data processor 214 at the BS 104a.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the UE 106a.

The reverse link message may comprise various types of information regarding the communication link and/or the received data stream. The reverse link message is then processed by a TX data processor 238. The TX data processor 238 also receives traffic data for a number of data streams from a data source 236. The modulator 280 modulates the data streams. Further, the transceivers 254A through 254R condition the data streams and transmit the data streams back to the BS 104a.

At the BS 104a, the modulated signals from the UE 106a are received by the antennas 224. Further, the transceivers 222 condition the modulated signals. A demodulator ("DE-MOD") 240 demodulates the modulated signals. A RX data processor 242 processes the demodulated signals and extracts the reverse link message (e.g., information) transmitted by the UE 106a. The processor 230 then determines which pre-coding matrix to use for determining the beam-forming weights. Further, the processor 230 processes the extracted message. It should be appreciated that for each BS 104a and UE 106a the functionality of two or more of the described components may be provided by a single component.

It should be understood that FIG. 2 is just one example of an UE 106a and a BS 104. The UE 106a and the BS 104 may also each comprise any suitable communication device may further comprise a memory for storing data and/or instructions, a processor for executing instructions and performing the methods described herein, and a transceiver (or a receiver and a transmitter) for communicating data and/or some other communication interface.

In communications networks, such as shown in FIG. 1, inter-cell interference from one or more non-serving base stations may result in reduced communication quality. For example, communications from the BS 104d to UE 106j in cell 102d may cause interference with communications from BS 104f to UE 106f in cell 102f. As shown in FIG. 1, the signals causing interference are illustrated as dashed lines, while the actual communication signals desired between devices are illustrated as solid lines. This occurs because the signals sent by each BS 104 do not remain only within the cell 102 where the BS 104 is located, but rather also travel into other cells. Inter-cell interference may be more apparent at the edge of a given cell 102, where the signals transmitted from the serving BS 104 are weakest, and the signals transmitted from the non-serving BS 104 are strongest. The interference may require data throughputs be reduced, such as to accommodate additional error correcting codes in communication so as to offset the interference.

In order to reduce inter-cell interference, BSs 104 in different cells 102 may coordinate the use of pre-coding matrices with one another. Such coordination may improve the received signal to interference and noise ratio (SINR) at the UEs 106 served by a given BS 104. For example, the use of a particular pre-coding matrix by the BS 104a to communicate with the UE 106a it serves may improve the SINR at the UE 106a. Similarly, the restriction of use of a particular pre-coding matrix by other BSs 104 (e.g., neighboring BSs 104c, 104d, and 104b in respective neighboring cells 102) in the vicinity of the cell 102a served by the BS 104a may improve the received SINR at the UE 106a. This may occur because signals transmitted using the same pre-coding matrix are more likely to interfere with one another. Therefore, it may be beneficial to determine which BS 104 should use which pre-coding matrices in order to improve communications throughout the network 100. It should be noted that though examples herein are described with respect to pre-coding matrices, other transmission factors may be coordinated between BSs in a similar fashion, such as other types of codebooks.

As discussed above with respect to FIG. 2, the UE 106a and the BS 104a determine pre-coding matrices to use for communicating. Below are described various methods that may be performed by UEs 106 and/or BSs 104 in order to coordinate determination of the use of such pre-coding matrices for communication.

In some embodiments, the UEs 106 and/or BSs 104 can be configured to enable and exploit distributed and iterative coordinated scheduling described herein to determine the use of pre-coding matrices for communication. The distributed and iterative coordinated scheduling improves the received SINR at a UE 106, by restricting utilization of one or more pre-coding matrices by a coverage cell causing interfering to users within a serving coverage cell. The coverage cell that causes interference is termed herein "interfering cell." The scheduling may be performed between a set of cells referred to as a cluster as it may not be feasible to coordinate scheduling between all of the cells in a given network. Selection of cells for a given cluster is further described later in this application.

In some embodiments, the UEs 106 gather relevant information regarding interference received from interfering cells 102. The UEs 106 may transmit this information, information regarding a pre-coding matrix the UE 106 wants to use, and/or information regarding a pre-coding matrix the UE 106 does not want other cells in the same cluster as the UE 106 to use to a respective serving BS 104 and/or BSs 104 of interfering cells 102 of the cluster.

The BSs 104 of a cluster may utilize this information from the UEs 106 to coordinate the use of pre-coding matrices for communications in the cells 102. For example, the BS 104a may calculate, as a utility metric, a loss in communication quality with the UE 106a (and additional UEs 106 served by the BS 104a, which are not shown) if a certain pre-coding matrix is not used by the BS 104a in the cell 102a. The BS 104a may further compare this loss in the utility metric to the gain in the utility metric from the use of the pre-coding matrix by UEs 106 (e.g., UE 106c) served by a BS 104 (e.g., BS 104c) in a neighboring cell 102 (e.g., cell 102c). If the gain in the utility metric from use of the pre-coding matrix in cell 102c is greater than the loss of the utility metric from restricting use of the pre-coding matrix in cell 102a, the BSs 104 (e.g., BS 104a and BS 104c) may coordinate to restrict use of the pre-coding matrix in the cell 102a and allow use of the pre-coding matrix in cell 102c. The gathering of information by the UEs 106 and the coordination by the BSs 104 is discussed in greater detail below.

In one embodiment, the UE 106 transmits only a restriction request (information regarding a pre-coding matrix the UE 106 does not want other cells in the same cluster as the UE 106 to use) to a respective serving BS 104 and/or BSs 104 of interfering cells 102 of the cluster without performing any metric calculations. BSs 104 that receive such a restriction request may be configured to automatically grant any such received restriction requests. Accordingly, such a restriction request may also be considered an instruction to restrict use of a particular pre-coding matrix. Such an embodiment eliminates the need to perform any utility metric calculations. Further, in such an embodiment, though the overall sum of the utility for UEs 106 may not be maximized, the utility for UEs 106 near the edges of cells 102 will be increased, while potentially sacrificing the utility of UEs 106 near the centers of cells 102. This may be beneficial since UEs near the edges of cells 102 typically have much lower data throughput than UEs 106 near the centers of cells 102. Thus, the gain in utility to UEs near the edges of cells 102 will typically be greater than the loss in utility to UEs 106 near the centers of cells 102.

Figure 3:
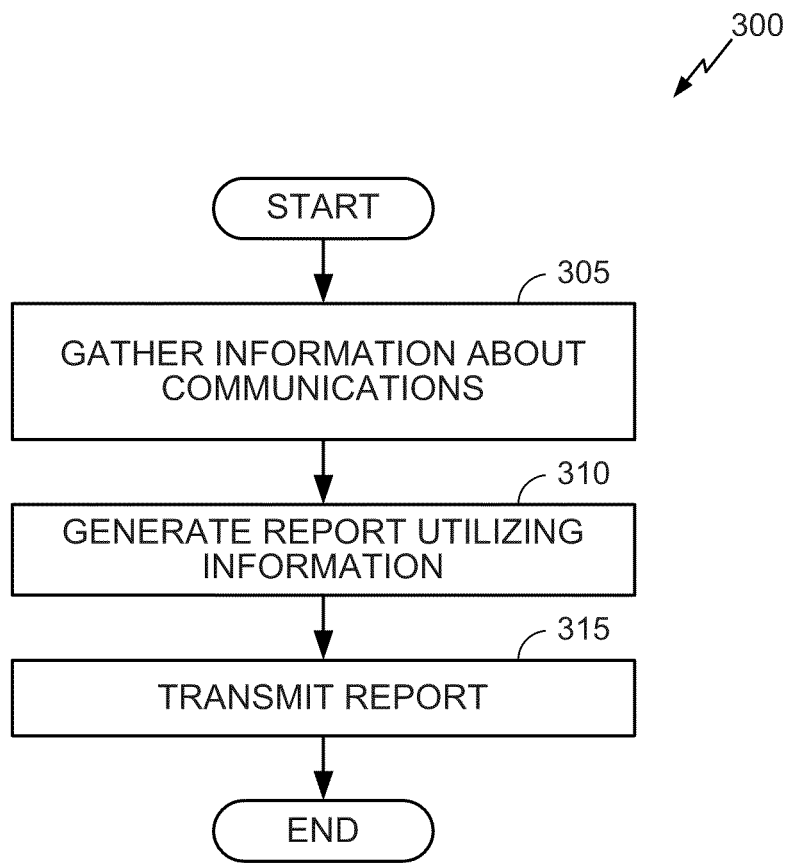
FIG. 3 is a flowchart of an exemplary process for transmitting relevant information for scheduling from the user equipment to the base station shown in FIG. 1.

FIG. 3 is a flowchart of an exemplary process for transmitting relevant information for scheduling from the UE 106 to the BS 104 in FIG. 1. In one embodiment, at a first step 305, each UE 106 (e.g., UE 106*a*) gathers relevant information, such as by determining certain information as discussed below.

Further, at a step 310, each UE 106 generates a channel quality indicator (CQI) report and/or pre-coding matrix indicator (PMI) report. Continuing at a step 315, each UE 106 transmits the generated report(s) to a respective serving BS 104 (BS 104*a*) and/or BSs 104 of interfering cells of the cluster to indicate a preference for one or more pre-coding matrices based on the current use of pre-coding matrix by UEs 106 in the network. In various embodiments, the UE 106*a* can report different information to different BSs 104. The report may include a utility metric function indicative of a link level performance of the UE 106*a* with the BS 104*a*. In various embodiments, the utility metric function may additionally or alternatively be indicative of: a signal-to-interference-and-noise ratio, an instantaneous supportable data rate at a residual block error rate, a long-term data throughput or a ratio of an instantaneous supportable data rate at a residual block error rate, a long-term data throughput, and/or a worst interferer. By way of example, but not limitation, the metric function can depend on the transmitted power of a signal, the pre-coding matrix associated with the signal, the interference power of the signal and/or the pre-coding matrices used by one or more interfering BSs 104 identified by the UE 106*a*.

Along with the PMI or separately, each UE 106 (e.g., UE 106*a*) can transmit a restriction request to a respective serving BS 104 (BS 104*a*) and/or BSs 104 of interfering cells of the cluster to indicate a preference for one or more pre-coding matrices. For example, the restriction request can include information indicative of a pre-coding matrix that the UE 106*a* does not want another cell to use due to the interference caused upon use. As such, the UE 106*a* can request that the pre-coding matrix be restricted from use. The restriction request can be included in the report. In one implementation, a UE 106*a* transmits restriction requests for pre-coding matrices that are identified to cause interference above a particular threshold level, so as not to overburden the coordinated scheduling.

In the embodiments where the UE 106*a* only sends the PMI report and/or restriction request to its serving BS 104*a*, the serving BS 104*a* further sends information to other BSs 104 in the cluster such that each BS 104 in the cluster has information about restriction requests and metrics for the UEs 106 in the cluster.

As part of generating the PMI report and/or restriction request for transmission to the BS 104*a*, the UE 106*a* may gather information and determine certain metrics. For example, the UE 106*a* may determine a preferred pre-coding matrix for communications with the BS 104*a*. The UE 106*a* may make this determination under the assumption that all signals from BSs 104 that interfere with communications of the UE 106*a* during a given transmission time interval (TTI) have the same powers and use the same pre-coding matrices as detected and determined by the UE 106*a* during the given TTI without any assumption of coordination. The preferred pre-coding matrix may be referred to as "pre-coding matrix B" and the value of the utility metric function associated with use of the pre-coding matrix B may be referred to as u(B).

The UE 106*a* may further determine a worst interferer from among the interfering BSs 104 in the same cluster as the UE 106*a*. For each relevant interfering BS 104 (e.g., a BS 104 from which the UE 106*a* receives signals of a power that is above a certain threshold), the UE 106*a* may determine a respective interference metric function. The interference metric function can be based, at least, on an assumption that the interferer BS 104 is not transmitting data and/or is silent, a pre-coding matrix of the BS 104*a* serving the UE 106*a* being constant and/or the power of a signal from the BS 104*a* serving the UE 106*a* being constant. For example, the UE 106*a* may assume the interfering BS 104 is not transmitting data and therefore can compare the utility value to the utility value of using the pre-coding matrix when the interfering BS 104 is transmitting in order to determine the loss in utility. In addition, the UE 106*a* may assume the serving BS 104*a* will transmit at the same power level using the same pre-coding matrix as when the interference was detected, thereby eliminating the need to estimate how changes in the transmit power level or the pre-coding matrix of the serving BS 104*a* affects interference. The UE 106*a* can determine from which interferer BS 104 the interfering signal is from by detecting a cell ID in the signal that identifies the BS 104. The pre-coding matrix being used by the BS 104 at that time is an interfering pre-coding matrix. The UE 106*a* can evaluate the interference metric functions generated for the set of interferers. The UE 106*a* can determine the worst interferer to be the interferer that has the greatest interference metric function. The greatest interference metric function value may be referred to as $u(B|B_w=0)$.

The UE 106*a* may further determine a pre-coding matrix $B_w$ that when used by the worst interferer results in the smallest value of the utility function u. This pre-coding matrix $B_w$ therefore is the worst pre-coding matrix that can be used by the worst interferer from the perspective of the UE 106*a* as it corresponds to the highest level of interference at the UE 106*a*. The corresponding metric value if the worst interferer does not use the pre-coding matrix $B_w$ may be referred to as $u(B|B_w)$.

The UE 106*a* may also determine a pre-coding matrix $B_b$ that when used by the worst interferer results in the largest value of the utility function u. This pre-coding matrix $B_b$ therefore is the best pre-coding matrix that can be used by the worst interferer from the perspective of the UE 106*a* as it corresponds to the lowest level of interference at the UE 106*a*. The corresponding metric value if the worst interferer uses the pre-coding matrix $B_b$ may be referred to as $u(B|B_b)$.

The UE 106*a* may further include in the PMI report and/or a separate report information indicative of u(B), $u(B|B_w=0)$, $u(B|B_w)$, and/or $u(B|B_b)$. For example, in some embodiments, the UE can report the difference in the metric values associated with the worst PMI and the pre-coding matrix: u(B|Bw)−u(B) and/or the PMI related to Bw. In another example, the UE can report the difference in the metric values associated with the best PMI and the pre-coding matrix: u(B|Bb)−u(B) and/or the PMI related to pre-coding matrix, Bb. In another example, the UE can report the metric values associated with the worst PMI, the metric value associated with the pre-coding matrix and/or the pre-coding matrix, Bw. In another example, the UE can report the metric values associated with the best PMI, the metric value associated with the best PMI, the metric value associated with the pre-coding matrix, the pre-coding matrix, Bb and/or the pre-coding matrix, Bw. In another example, the UE can report the metric values associated with the interfering BS 104 for which the metric value u(B|Bw=0) (and the interfering BS 104 is determined to be the worst interferer).

The BSs 104 of a cluster may utilize this information from the UEs 106 including restriction requests to coordinate the use of pre-coding matrices for communications in the cells 102.

As discussed above, BSs 104 can coordinate use of pre-coding matrices by making pair-wise comparisons of losses and gain in utility metrics of UEs 106. The comparisons of one BS 104 may be independent of the comparisons of another BS 104. The results of these comparisons can be used to decide whether to use or not to use a particular pre-coding matrix for communication in a cell 102. In the embodiments described below, no central entity is used to support coordination among the BSs 104. Therefore, a distributed approach is used with a goal of maximizing the sum of utilities of the UEs 106 in all the cells 102 of the cluster.

Given a definition of a utility metric for each UE 106, BSs 104 in a cluster can therefore make scheduling decisions such as to increase the likelihood of maximizing the sum of the utilities of all scheduled UEs 106 in the cluster (while considering pre-coding matrix restrictions).

For example, the sum utility of the cluster can be represented by the following equation:

$$U = \sum_{i=1}^{S} \sum_{j=1}^{N_i} u_{ij}$$

where S is the cluster size, and Ni is the number of UEs 106 that would be scheduled in cell i. The method of maximizing such a utility function is discussed in detail below.

Figure 4:
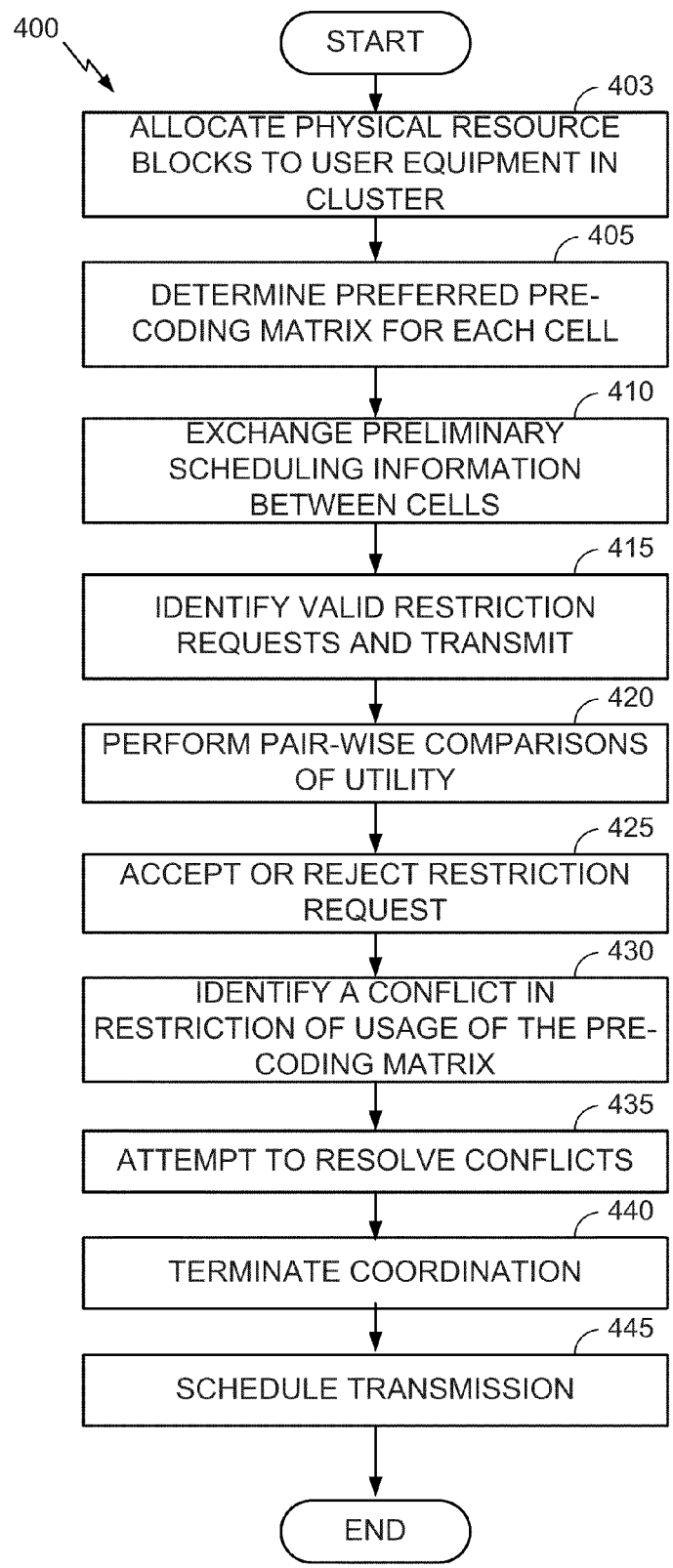
FIG. 4 is a flowchart of an exemplary process for scheduling communications in the wireless communication network shown in FIG. 1.

FIG. 4 is a flowchart of an exemplary process for scheduling communications in the wireless communication network shown in FIG. 1. At a first step 403, one or more physical resource blocks (PRBs) are allocated to the UEs 106 in the cluster. In one embodiment, each BS 104 in the cluster ranks the UEs 106 it serves that are eligible to receive a PRB for data transmission from its serving BS 104 to the UE 106. The ranking can be based on any determined or pre-defined schedule metric. The ranking may be performed for each available PRB in each cell.

Continuing at a step 405, each BS 104 may determine a pre-coding matrix for use by the UEs 106 served by the respective BS 104. The preference for a given pre-coding matrix may be based on, for example, restriction requests and/or PMI reports received from the UEs 106. For example, the BS 104a may select the pre-coding matrix that gives the UE 106a the highest SINR and/or metric function value based on current network conditions.

Further at a step 410, the BSs 104 in the cluster may exchange preliminary scheduling information with each other. The preliminary scheduling information can include, but is not limited to, information about PRB allocations and/or pre-coding matrices. The preliminary scheduling information may be exchanged, in some embodiments, based, at least, on receipt of a restriction request by a BS 104 from a UE 106.

Additionally at a step 415, the BSs 104 identify which restriction requests received from UEs 106 are valid. For each PRB, a BS 104 can identify valid restriction requests based, at least, on the preliminary scheduling information that the BS 104 receives from other BSs 104 in the cluster. For embodiments wherein identification of valid restriction requests is made at a serving BS 104, the valid restriction request can be transmitted to the interfering BS 104 from the serving BS 104.

Continuing at a step 420, the BSs 104 may perform pair-wise comparisons of loss versus gains in utility metrics within and across coordinating cells 102. One method of performing such pair-wise comparisons is further described below with respect to FIG. 5.

Further at a step 425, the BSs 104 can accept or reject a restriction request, and communicate the corresponding decision to other BSs 104 and/or UEs 106. The scheduler for a BS 104 can accept a restriction request if the utility loss for a UE 106 in the cell served by the BS 104 is less than the sum of utility gains for UEs 106 in other cells. Communicating the decision to accept a restriction request, the BS 104 can transmit a message that includes information indicative of the decision to accept the restriction request. The message can be transmitted to the other BSs 104 in the cluster.

In some embodiments, the BS 104 can reject the restriction request if the utility loss for a UE 106 in the cell 102 served by the BS 104 is greater than the sum of utility gains for UEs 106 in other cells 102. To communicate the decision to reject a restriction request, the BS 104 can transmit a message that includes information indicative of the decision to reject the restriction request. In some embodiments, the message can be transmitted to the UE 106 that transmitted the restriction request. In some embodiments, no message may be sent from the BS 104. The lack of a message from the BS 104 can implicitly signal a rejection.

Additionally at a step 430, the BSs 104 identify a conflict in restriction of the usage of the pre-coding matrix. For example, a conflict can arise in case wherein a first BS 104a agrees to restrict usage of a first pre-coding matrix B (such as based on a restriction request from a UE served by a BS 104c), while, during a same or overlapping time period, a second coordinating BS 104b agrees to a restriction request from a UE 106a served by the BS 104a based on an assumption that the first pre-coding matrix, B, would still be used by the first BS 104a. The conflict in understanding of the usage of the first pre-coding matrix B, can be identified by a BS 104 receiving messages including information indicative of the acceptance of the restriction. For example, the BS 104a can consider the content of messages received from the other coordinating BSs 104, and the messages that the BS 104a transmits (accepting or rejecting restriction requests on a particular pre-coding matrix) in response to one or more restriction requests that the BS 104a receives for that or other pre-coding matrices.

Continuing at a step 435, the BSs 104 can resolve conflicts identified in restriction usage of a pre-coding matrix. For example, to resolve the conflict, the BS 104a can compare the utility gain that the BS 104a evaluated before accepting a restriction on the pre-coding matrix B, and the utility gain evaluated by the other coordinating BS 104b that assumed that B is used at the BS 104a. Based on the result of this comparison, the BS 104a can transmit another message, if appropriate. For example, the BS 104a can reject an acceptance that the BS 104a received or revoke an acceptance that the BS 104a transmitted to the BS 104c or another BS 104 currently or previously. The conflict resolution step may be performed iteratively until all conflicts are resolved or until some other time period.

Further at a step 440, coordination between BSs 104 may be terminated if all conflicts are resolved. In some cases, however, all conflicts may not be resolved within a given time period and coordination between BSs 104 may be ended before all conflicts are resolved. For example, if termination of the coordination occurs before the transmit time interval (TTI) initially intended for data transmission begins, the BSs 104 can inform others BSs 104 by transmitting a termination message and, at a step 445, scheduling transmission to the UEs 106 in their serving cells 102 in the next TTI. The BSs 104 can also transmit a termination message if a BS 104 has not accepted a restriction request for any pre-coding matrices on any PRBs. As discussed above, such can be the case wherein a BS 104 does not accept a restriction request for any pre-coding matrix on any PRB if the BS 104 determines that acceptance would not result in a utility gain.

At the step 445, if all conflicts in restriction usage are not resolved before the TTI begins, the BSs 104 can schedule transmission to their UEs 106 according to the decisions already made. As before, the UEs 106 can be scheduled to receive data from the BSs 104 in the intended TTI.

The UEs 106 scheduled can then receive during the next TTI. Further, the method may be repeated for additional TTIs after termination for a given TTI.

Figure 5:
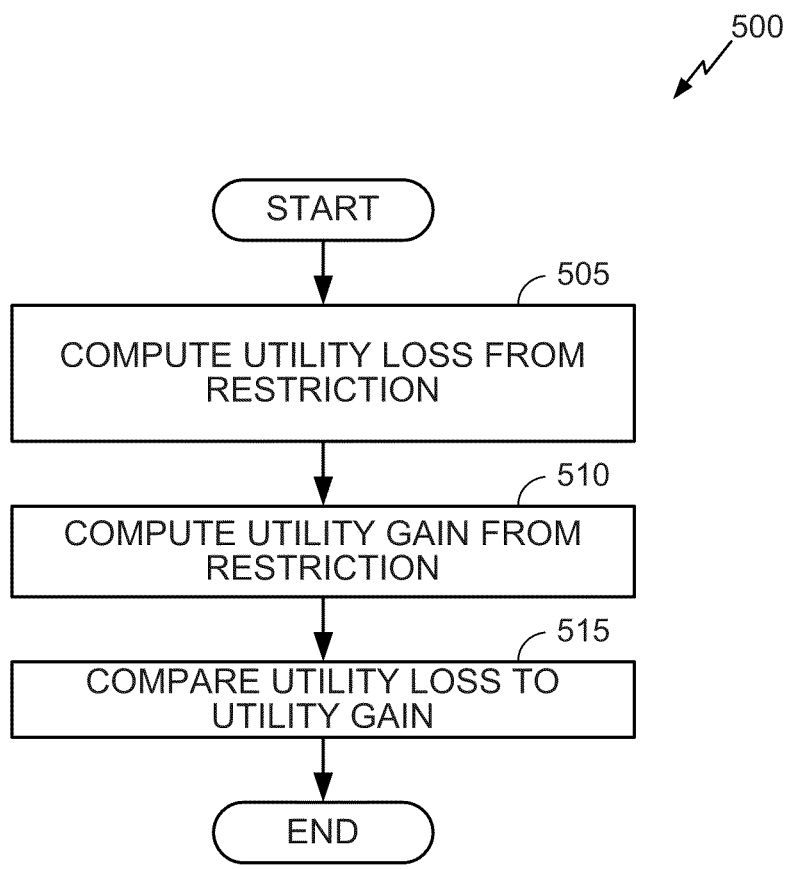
FIG. 5 is a flowchart of an exemplary process for performing pair-wise comparisons of loss versus gains in utility metrics within and across coordinating cells.

FIG. 5 is a flowchart of an exemplary process for performing pair-wise comparisons of loss versus gains in utility metrics within and across coordinating cells 102. For example, in some embodiments, for each PRB, at a step 505, a scheduler at a BS 104 can compute a loss in utility metric for UEs 106 served by the BS 104 in a given cell 102 if the pre-coding matrix preferred for the UE 106 is restricted. Further, at a step 510 the schedule can compute the gain in the utility metric associated with UEs 106 in other coordinating cells 102 that would benefit from the restriction. Continuing at a step 515, the scheduler can make the pair-wise comparison of utility losses versus utility gains under the assumption of restriction of the pre-coding matrix.

In one embodiment the pair-wise comparisons discussed above can be performed as follows. For each PRB, each BS 104 assumes that restriction of only one pre-coding matrix is allowed. In the example described below, UE 106a, UE 106c, and UE 106g are assumed to all be allocated to the same PRB. The UEs 106a, 106c, and 106j are served by BSs 104a, 104c, and 104d, respectively. In the example described below, it is assumed the UE 106a transmits information to the BS 104a indicating its preferred pre-coding matrix is B. Further, the UE 106c transmits information to the BS 104c indicating its preferred pre-coding matrix is B'. Additionally, the UE 106j transmits information to the BS 104d indicating its preferred pre-coding matrix is B". Also, it is assumed the UE 106a transmits information to the BS 104c requesting restriction of pre-coding matrix B'. Further, the UE 106c transmits information to the BS 104d requesting restriction of pre-coding matrix B". Additionally, the UE 106j transmits information to the BS 104a requesting restriction of pre-coding matrix B.

Each BS 104 can perform a pair-wise comparison of utility loss for the BS 104's own UEs 106 reporting a pre-coding matrix as preferred and utility gain of the UEs 106 in the neighboring cell requesting restriction of that pre-coding matrix. For example, BS 104a may make the following comparison:

$$u_1(B) - \max\left(\operatorname*{argmax}_{\tilde{B}} u_1(\tilde{B}), \tilde{u}_1(\tilde{B})\right) \sim u_3(B'' \mid B) - u_3(B'')$$

where, $u_1(B)$ is the utility for UE 106a when using pre-coding matrix B without any cooperation with neighboring cells;

$u_1(\tilde{B})$ is the utility for UE 106a when using pre-coding matrix $\tilde{B}$ (any other pre-coding matrix than B) without any cooperation with neighboring cells;

$\tilde{u}_1(\tilde{B})$ is the utility for another UE 106 (other than UE 106a (e.g., the next UE 106 served by UE 106a and ranked for the PRB) served by BS 104a when using pre-coding matrix $\tilde{B}$ (any other pre-coding matrix than B) without any cooperation with neighboring cells;

$$\max\left(\operatorname*{argmax}_{\tilde{B}} u_1(\tilde{B}), \tilde{u}_1(\tilde{B})\right)$$

is the maximum utility between $u_1(\tilde{B})$ and $\tilde{u}_1(\tilde{B})$, which may be $\tilde{u}_1(\tilde{B})$ if the preferred pre-coding matrix B of the UE 106a is restricted at the BS 104a;

$u_3(B''|B)$ is the utility for UE 106j served by BS 104d when using pre-coding matrix B" and assuming pre-coding matrix B is not used by BS 104a;

$u_3(B'')$ is the utility for UE 106j when using pre-coding matrix B" without any cooperation with neighboring cells; and "~" denotes a comparison between $$u_1(B) - \max\left(\operatorname*{argmax}_{\tilde{B}} u_1(\tilde{B}), \tilde{u}_1(\tilde{B})\right)$$

and $u_3(B''|B)-u_3(B'')$.

Similarly, BS 104c can make the following comparison:

$$u_2(B') - \max\left(\operatorname*{argmax}_{\tilde{B}} u_2(\tilde{B}), \tilde{u}_2(\tilde{B})\right) \sim u_1(B \mid B') - u_1(B)$$

where, $u_2(B')$ is the utility for UE 106c when using pre-coding matrix B' without any cooperation with neighboring cells;

$u_2(\tilde{B})$ is the utility for UE 106c when using pre-coding matrix $\tilde{B}$ (any other pre-coding matrix than B') without any cooperation with neighboring cells;

$\tilde{u}_2(\tilde{B})$ is the utility for another UE 106 (other than UE 106c) served by BS 104c when using pre-coding matrix $\tilde{B}$ (any other pre-coding matrix than B') without any cooperation with neighboring cells;

$$\max\left(\operatorname*{argmax}_{\tilde{B}} u_2(\tilde{B}), \tilde{u}_2(\tilde{B})\right)$$

is the maximum utility between $u_2(\tilde{B})$ and $\tilde{u}_2(\tilde{B})$, which may be $\tilde{u}_2(\tilde{B})$ if the preferred pre-coding matrix B' of the UE 106c is restricted at the BS 104c;

$u_1(B|B')$ is the utility for UE 106a served by BS 104a when using pre-coding matrix B and assuming pre-coding matrix B' is not used by BS 104c;

$u_1(B)$ is the utility for UE 106a when using pre-coding matrix B without any cooperation with neighboring cells; and "~" denotes a comparison between $$u_2(B') - \max\left(\underset{\tilde{B}}{\mathrm{argmax}}\, u_2(\tilde{B}), \tilde{u}_2(\tilde{B})\right)$$

and $u_1(B|B')-u_1(B)$.

Similarly, BS 104*d* can make the following comparison:

$$u_3(B'') - \max\left(\underset{\tilde{B}}{\mathrm{argmax}}\, u_3(\tilde{B}), \tilde{u}_3(\tilde{B})\right) \sim u_2(B'|B'') - u_2(B')$$

where,

- $u_3$ (B") is the utility for UE 106*j* when using pre-coding matrix B" without any cooperation with neighboring cells;
- $u_3(\tilde{B})$ is the utility for UE 106*j* when using pre-coding matrix $\tilde{B}$ (any other pre-coding matrix than B") without any cooperation with neighboring cells;
- $\tilde{u}_3(\tilde{B})$ is the utility for another UE 106 (other than UE 106*j*) served by BS 104*d* when using pre-coding matrix $\tilde{B}$ (any other pre-coding matrix than B") without any cooperation with neighboring cells;

$$\max\left(\underset{\tilde{B}}{\mathrm{argmax}}\, u_3(\tilde{B}), \tilde{u}_3(\tilde{B})\right) \text{ is the}$$

maximum utility between $u_3(\tilde{B})$ and $\tilde{u}_3(\tilde{B})$, which may be $\tilde{u}_3(\tilde{B})$ if the preferred pre-coding matrix B" of the UE 106*j* is restricted at the BS 104*d*;

- $u_2$ (B'|B") is the utility for UE 106*c* served by BS 104*c* when using pre-coding matrix B' and assuming pre-coding matrix B" is not used by BS 104*d*;
- $u_2(B')$ is the utility for UE 106*c* when using pre-coding matrix B' without any cooperation with neighboring cells; and "~" denotes a comparison between $$u_3(B'') - \max\left(\underset{\tilde{B}}{\mathrm{argmax}}\, u_3(\tilde{B}), \tilde{u}_3(\tilde{B})\right)$$

and $u_2(B'|B'')-u_2(B')$.

The results of the pair-wise comparisons may be as follows:

$$u_1(B) - \max\left(\underset{\tilde{B}}{\mathrm{argmax}}\, u_1(\tilde{B}), \tilde{u}_1(\tilde{B})\right) < u_3(B''|B) - u_3(B'')$$

$$u_2(B') - \max\left(\underset{\tilde{B}}{\mathrm{argmax}}\, u_2(\tilde{B}), \tilde{u}_2(\tilde{B})\right) < u_1(B|B') - u_1(B)$$

$$u_3(B'') - \max\left(\underset{\tilde{B}}{\mathrm{argmax}}\, u_3(\tilde{B}), \tilde{u}_3(\tilde{B})\right) > u_2(B'|B'') - u_2(B')$$

In response to the pair-wise comparisons performed by the BSs 104, BS 104*a* may send a request grant message to BS 104*d* indicating that the restriction request from the UE 106*j* has been accepted. BS 104*c* can send to BS 104*a* a request grant message indicating that the restriction request from the UE 106*a* has been accepted. BS 104*d* can send to BS 104*c* a request reject message indicating that the restriction request from the UE 106*c* has been rejected. In some embodiments, the request grant message can include the net gain in utility computed by the BS 104 sending the request grant. The net gain in utility can be the difference of the utility gain and the utility loss that would result from accepting the restriction request relative to the pre-coding matrix for which a UE 106 has requested restriction.

Further as discussed above, the BSs 104 identify a conflict in restriction of the usage of the pre-coding matrix, such as between the request grant and request reject messages discussed in the above example. Examples of identifying and resolving such conflicts are discussed below.

In one example, BS 104*a* can identify a conflict as follows. BS 104*a* has received a grant from BS 104*c* allowing the use of pre-coding matrix B, while sending a grant to BS 104*d* accepting the restriction of pre-coding matrix B. Since the grant from BS 104*c* is based on BS 104*a* using pre-coding matrix B, this is in conflict with the BS 104*a* accepting restriction of that same pre-coding matrix B. In order to resolve the conflict, the BS 104*a* may perform an additional pair-wise comparison as follows:

$$u_3(B''|B)-u_3(B'')-u_1(B)+\tilde{u}_1(\tilde{B})\sim u_1(B|B')-u_1(B)-u_2(B')+\tilde{u}_2(\tilde{B})$$

In particular, the BS 104*a* compares the net utility gain within the cluster from restricting the use of pre-coding matrix B to the net utility gain within the cluster from using pre-coding matrix B based on the utility information received from the BS 104*c*.

If $u_3(B''|B)-u_3(B'')-u_1(B)+\tilde{u}_1(\tilde{B})>u_1(B|B')-u_1(B)-u_2(B')+\tilde{u}_2(\tilde{B})$, the BS 104*a* determines that restricting the use of pre-coding matrix B has a greater net utility gain than restricting the use of pre-coding matrix B'. Accordingly, the BS 104*a* transmits a grant reject message to the BS 104*c* indicating that BS 104*c* may use pre-coding matrix B' again.

In this case, the final scheduling decisions, after both iterations can include: the precoding matrix B not being used by the BS 104*a* (e.g. another UE 106 served by the BS 104*a* may be scheduled with a precoding matrix≠B instead of UE 106*a*), UE 106*c* scheduled with precoding matrix B', and UE 106*j* scheduled with precoding matrix B".

If $u_3(B''|B)-u_3(B'')-u_1(B)+\tilde{u}_1(\tilde{B})>u_1(B|B')-u_1(B)-u_2(B')+\tilde{u}_2(\tilde{B})$, the BS 104*a* determines that restricting the use of pre-coding matrix B has a lower net utility gain than restricting the use of pre-coding matrix B'. Accordingly, the BS 104*a* transmits a grant reject message to the BS 104*d* indicating that BS 104*a* will use pre-coding matrix B despite the restriction request from the UE 106*j*.

In this case, the final scheduling decision, after both iterations can include: UE 106*a* being scheduled with pre-coding matrix B, the pre-coding matrix B' not being used by the BS 104*c* (e.g. another UE 106 served by the BS 104*c* may be scheduled with a pre-coding matrix≠B' instead of UE 106*c*), and the UE 106*j* being scheduled with pre-coding matrix indicator B".

In another example, a conflict may be detected at multiple BSs 104. For example. In the case of a conflict at all three BSs 104*a*, 104*c*, and 104*d*, the first iteration of a pair-wise comparisons of utility differences can be as follows at each of BSs 104*a*, 104*c*, and 104*d*.

At BS 104*a*:

$$u_1(B)-\tilde{u}_1(\tilde{B})<u_3(B''|B)-u_3(B'')$$

At BS 104*c*:

$$u_2(B')-\tilde{u}_2(\tilde{B})<u_1(B|B')-u_1(B)$$

At BS 104*d*:

$$u_3(B'')-\tilde{u}_3(\tilde{B})<u_2(B'|B'')-u_2(B')$$

Based on the comparisons, the BSs 104 may transmit the following messages: BS 104a transmits a request grant to BS 104d, BS 104c transmits a request grant to BS 104a, and BS 104d transmits a request grant to BS 104c. Accordingly, there is a conflict at each of the BSs 104a, 104c, and 104d.

Accordingly, in the second iteration, pair-wise comparisons of net utility gains for grant sent and grant received at each BS 104 can be performed. By way of example, but not limitation, an example result of pair-wise comparison of sent and received grants can be as follows:

$$u_3(B''|B) - u_3(B''') + \tilde{u}_1(\tilde{B}) > u_1(B|B') - u_2(B') + \tilde{u}_2(\tilde{B})$$

$$u_1(B|B') - u_1(B) + \tilde{u}_2(\tilde{B}) > u_2(B'|B''') - u_3(B''') + \tilde{u}_3(\tilde{B})$$

$$u_2(B'|B''') - u_2(B') + \tilde{u}_3(\tilde{B}) < u_3(B''|B) - u_1(B) + \tilde{u}_1(\tilde{B})$$

Therefore, the messages transmitted after the second iteration of pair-wise computations can be as follows: BS 104a sends a grant reject to BS 104c, thereby canceling the grant BS 104a received from BS 104c. BS 104c sends a grant reject to BS 104d, thereby canceling the grant BS 104c received from BS 104d. BS 104d sends a grant reject to BS 104c, thereby revoking the grant BS 104d sent from BS 104c.

Thus, the final scheduling decisions can include: the pre-coding matrix B not being used by the BS 104a (e.g. another UE 106 served by the BS 104a may be scheduled with a pre-coding matrix≠B instead of UE 106a), UE 106c being scheduled with pre-coding matrix B', and the UE 106j being scheduled with pre-coding matrix B".

Figure 6:
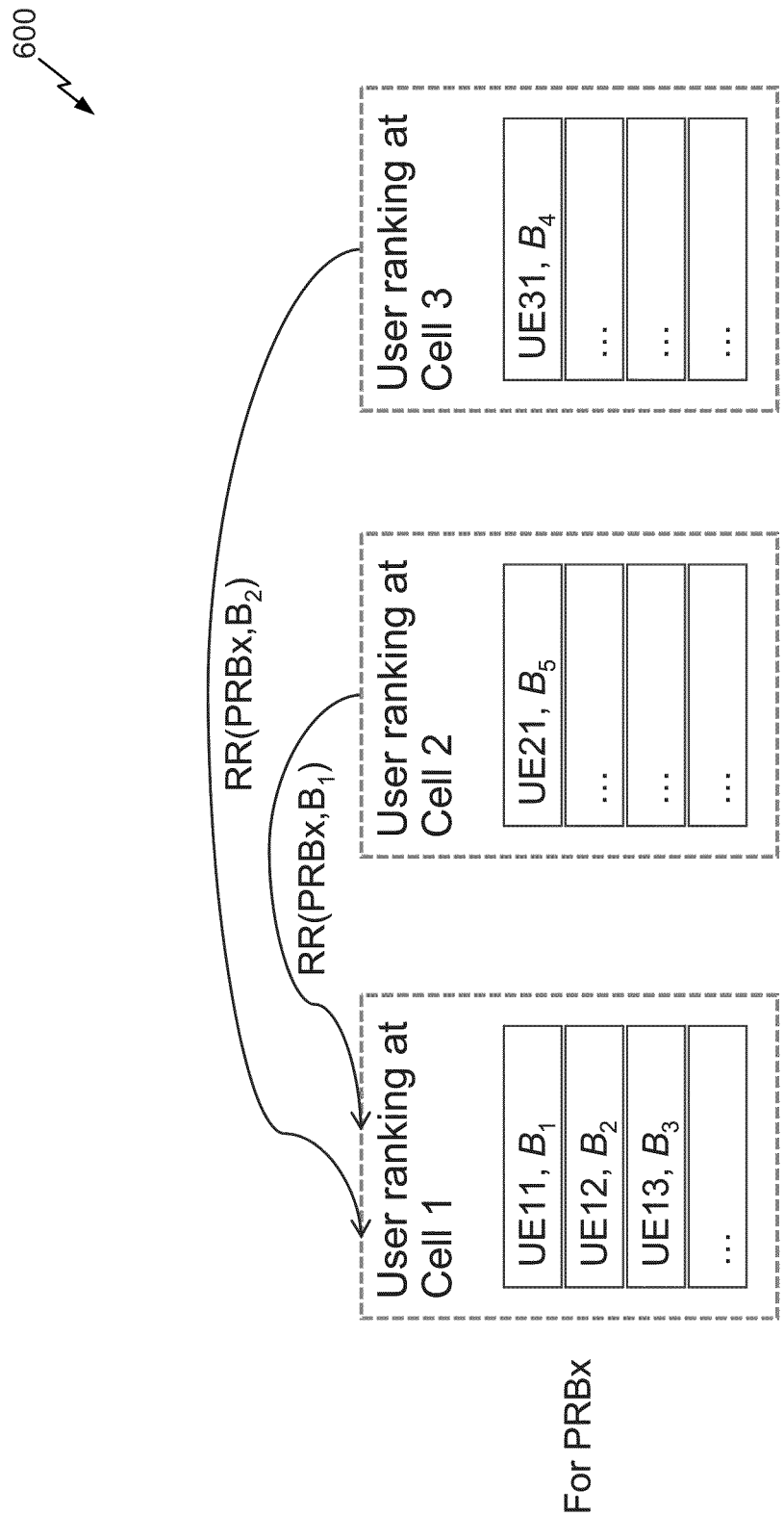
FIG. 6 illustrates pre-coding matrix preferences for multiple cells.

The above examples describe situations where only a single pre-coding matrix is restricted at a given BS 104 in a PRB. In the above examples where only one pre-coding matrix is allowed to be restricted at most per PRB (or PRB cluster), the utility loss can be the difference in utility of the best UE and the second best UE in the UE ranking for the PRB (or the PRB cluster). However, in some embodiments, restriction of more than one pre-coding matrix can be conducted simultaneously, or concurrently, for any given PRB. For example, a UE ranking for a given PRB at three coordinating cells 1, 2, and 3 with corresponding restriction requests can be as shown in FIG. 6. In this example, cell 1 is the serving cell of UE 11, UE 12, UE 13, etc. Further, cell 2 is the serving cell of UE 21, UE 22, UE 23, etc. Further, cell 3 is the serving cell of UE 31, UE 32, UE 33, etc. The preferred pre-coding matrix of each UE is listed next to the UE in FIG. 6.

As a first step, a first pair-wise comparison can be made as follows:

$$u_{11}(B_1) - u_{12}(B_2) \sim u_{21}(B_5|B_1) - u_{21}(B_5)$$

The result of the comparison may be as follows:

$$u_{11}(B_1) - u_{12}(B_2) < u_{21}(B_5|B_1) - u_{21}(B_5)$$

As a next step, it may be determined whether any restriction request was received for $B_2$ for the given PRB. If a restriction request was received, a second pair-wise computation can be performed as follows:

$$u_{11}(B_1) - u_{13}(B_3) \sim u_{21}(B_5|B_1) - u_{21}(B_5) + u_{31}(B_4|B_2) - u_{31}(B_4)$$

If the second pair-wise comparison also computes a positive net gain in utility, acceptance of a restriction for both $B_1$ and $B_2$ can be performed. A similar comparison can then be done for $B_3$ if a restriction request was received for $B_3$ as well. If the second pair-wise comparison does not compute a positive net gain in utility, the cell can accept the restriction request according to the first comparison above and send a request grant to cell 2 for $B_1$.

In some embodiments, cooperative silencing can be employed by cells as part of coordinated scheduling. For example, a cell that receives restriction requests from other coordinating cells can decide to blank a given PRB, if blanking the PRB would be helpful towards maximizing the sum utility. All UEs in other cells that would receive data on the same PRB as that which the cell blanks can benefit in this case. In this case, the variable B denotes the entire codebook of precoding matrices being restricted from use.

Cell 1 can compute the following (for the case when the PRB is allocated to UE11 with preferred precoding matrix $B_1$):

$$u_{11}(B_1) \sim \sum_{i \in S, i \neq 1} \sum_{j=1}^{N_i} u_{ij}(B_{ij}|B) - \sum_{i \in S, i \neq 1} \sum_{j=1}^{N_i} u_{ij}(B_{ij})$$

Cell 2 can compute the following (for the case when the PRBx is allocated to UE22 with preferred precoding matrix $B_2$):

$$u_{22}(B_2) \sim \sum_{i \in S, i \neq 2} \sum_{j=1}^{N_i} u_{ij}(B_{ij}|B) - \sum_{i \in S, i \neq 2} \sum_{j=1}^{N_i} u_{ij}(B_{ij})$$

Cell 3 can compute the following (for the case when the PRBx is allocated to UE22 with preferred precoding matrix $B_3$):

$$u_{33}(B_3) \sim \sum_{i \in S, i \neq 3} \sum_{j=1}^{N_i} u_{ij}(B_{ij}|B) - \sum_{i \in S, i \neq 3} \sum_{j=1}^{N_i} u_{ij}(B_{ij})$$

Based on the comparison result, a cell can send a request grant to other cells in the cluster. In the case of any conflicts, net utility gains reported in the request grants can be compared, followed by grant rejections as appropriate.

Cells 102 may be grouped together in a cluster in a variety of different ways. For example, cells 102 may be clustered based on antenna boresights of the respective BSs 104 being direct towards a common geographical location in a cluster. In another embodiment, cells 102 are clustered based on antennas of the respective BSs 104 facing one another.

In yet another embodiment, a serving BS 104 may be grouped in a cluster with one or more strong interferer BSs 104. This approach is a user-specific clustering approach as the strong interferer BSs 104 and the serving BS 104 can be determined relative to a specific UE 106a. The strong interferer BSs 104 can be identified by a UE 106a based on one or more measurements of a long-term signal quality metric. The strong interferer BSs 104 can be based on the UE 106a's geometry in some embodiments. For example, a serving BS 104a and the two strongest interferer BSs 104 based on the UE 106a's geometry can be grouped into a cluster. Employing this clustering approach, UEs in the same cell 102 could belong to different clusters.

Figure 7:
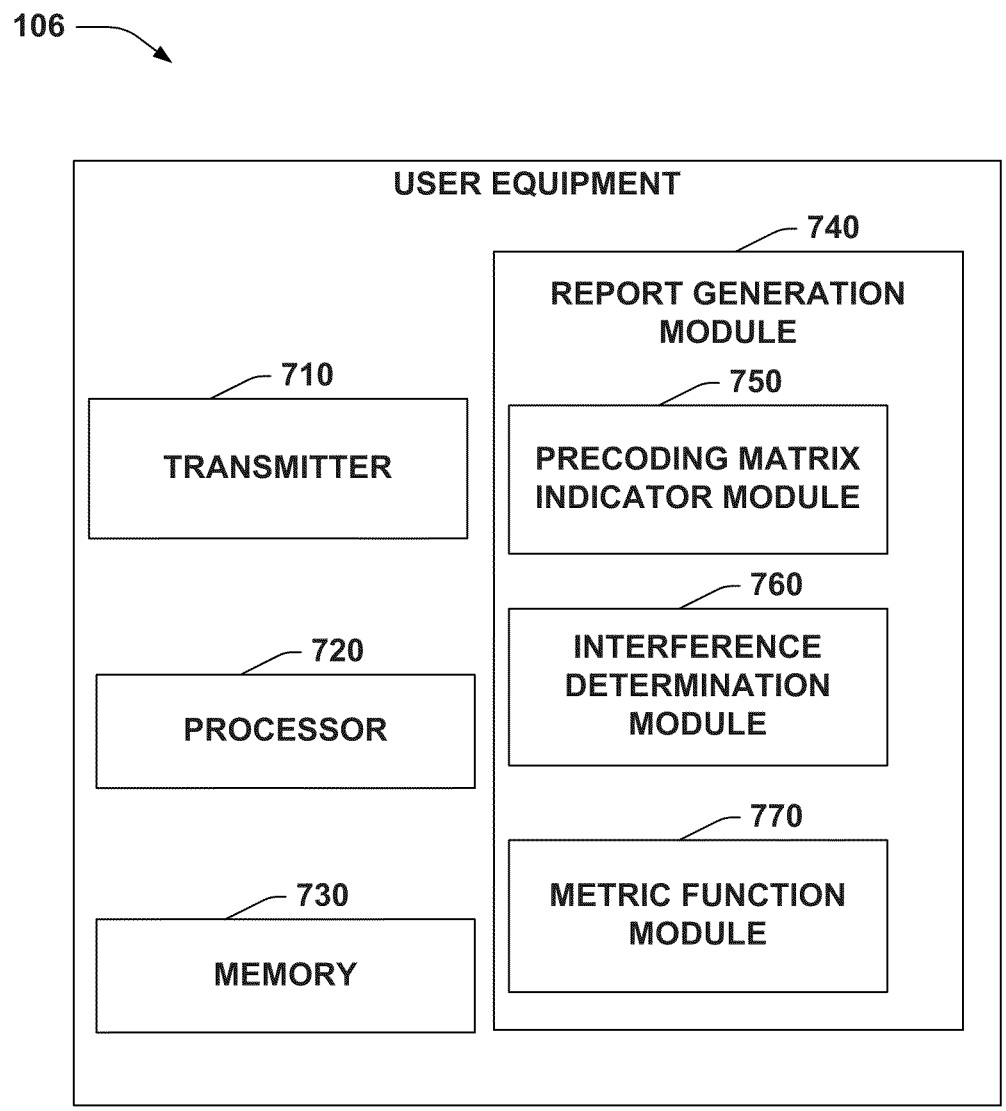
FIG. 7 illustrates a functional block diagram of another exemplary user equipment shown in FIG. 1.

FIG. 7 illustrates a functional block diagram of another exemplary user equipment 106 shown in FIG. 1. The UE 106 can include a transmitter 710, a processor 720, a memory 730 storing instructions that can be executed on the processor 720, a report generation module 740, a PMI module 750, an interference determination module 760 and/or a metric function module 770.

In some embodiments, the transmitter 710 can be configured to transmit a report, such as a PMI report, indicative of a link level performance. The report can be based, at least, on PMI information. The transmitter 710 can be configured to transmit the report to one or more BSs 104. The cells can be a serving BS 104, a worst interfering BS 104 or a serving BS 104 and a worst interfering BS 104 of the UE 106. The transmitter 710 can transmit the report over the air (OTA) or via the serving BS 104 for the UE 106.

The report generation module 740 can be configured to generate the report prior to the transmitter transmitting the report. The report generation module 740 can include: the PMI module 750, the interference determination module 760 and the metric function 770.

The PMI module 750 can be configured to determine a PMI. The PMI module 750 can also be configured to determine the PMI information. The metric function and the PMI information can be based, at least, on the worst interferer.

Determining the PMI can include: determining a precoding matrix of the worst interferer that results in a smallest value of the metric function; and determining a precoding matrix of the worst interferer that results in a largest value of the metric function.

The interference determination module 760 can be configured to determine a worst interferer.

The metric function module 770 can be configured to determine a metric function indicative of the link level performance. The processor 720 can be configured to perform any of the functions described herein.

Figure 8:
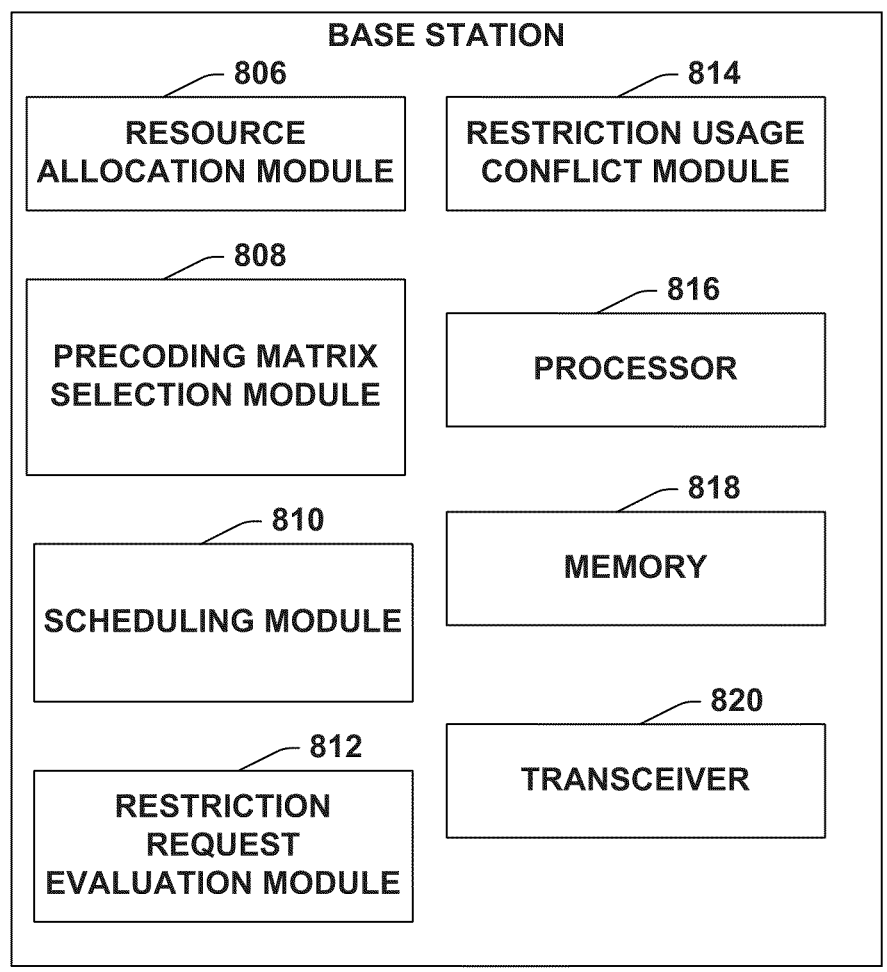
FIG. 8 illustrates a functional block diagram of another exemplary base station shown in FIG. 1.

FIG. 8 illustrates a functional block diagram of another exemplary BS 104 shown in FIG. 1. The BS 104 can include a resource allocation module 806 configured to allocate a PRB to the UE 106 in some embodiments. The cell 102 managed by BS 104 can be one of a plurality of coordinating cells in a cluster.

The BS 104 can also include a pre-coding matrix selection module 808 configured to select a preferred pre-coding matrix for use by the BS 104, a scheduling module 810 configured to communicate preliminary scheduling information about the physical resource block and the preferred pre-coding matrix, and a transceiver 820 configured to transmit a restriction request to at least one of the plurality of coordinating cells in the cluster.

The BS 104 can also include a restriction request evaluation module 812 configured to: perform a first iteration of a pair-wise computation of utility, wherein the pair-wise computation of utility is based, at least, on the restriction requests; and accept or reject the restriction request based, at least, on the one or more pair-wise computations.

The BS 104 can also include a restriction usage conflict module 814 configured to: identify a conflict in restriction usage associated with the precoding matrix; and resolve the conflict in restriction usage, wherein resolving is based, at least, on performing a second iteration of a pair-wise computation of utility. The BS 104 can identify a conflict resultant from a restriction request received from a UE 106 in a cell 102 outside of the cell managed by BS 104.

The BS 502 can also include a scheduling module 810 configured to: terminate coordination in response to at least one of: no conflicts in restriction usage being identified or no restriction request for any pre-coding matrix on any physical resource block being identified; and schedule the UE 106 in the cell to transmit data to during a next transmit time interval, in response to the terminating coordination.

The BS 104 can also include a processor 816 and a memory 818 storing instructions that can be executed by the processor 816 for performing one or more of the functions described herein.

One of ordinary skill in the art should recognize that various steps may by added or omitted from the processes described with respect to FIGS. 3-5. Further, the various steps of the processes may be performed in a different order than described above.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of coordinated scheduling in a wireless communication system, the method comprising:
receiving information regarding a set of one or more precoding matrices;
determining a first utility value for a first set of wireless devices served by a first access point based on restriction of the set of one or more precoding matrices;
determining a second utility value for a second set of wireless devices served by a second access point based on use of the set of one or more precoding matrices;
comparing the first utility value to the second utility value;
granting restriction of use of the set of one or more precoding matrices by the first access point based on the comparison;
identifying a conflict with a third access point based on the granting restriction of use of the set of one or more precoding matrices by the first access point; and
resolving the conflict by evaluating utility values for the first access point, the second access point, and the third access point.

2. The method of claim 1, wherein the information comprises a restriction request.

3. The method of claim 1, wherein resolving the conflict comprises identifying no conflicts in restriction.

4. The method of claim 1, further comprising scheduling the first access point to transmit data during a next transmit time interval, in response to resolving the conflict.

5. The method of claim 1, further comprising allocating a physical resource block to at least one of the first set of wireless devices.

6. The method of claim 1, further comprising exchanging scheduling information with at least one of the second access point and the third access point.

7. The method of claim 1, wherein granting restriction is based on the comparison between the first utility value and the second utility value.

8. The method of claim 1, further comprising rejecting restriction of use of another set of one or more precoding matrices by the first access point based on another comparison.

9. A first access point for coordinated scheduling in a wireless communication system, the first access point comprising:
a receiver configured to receive information regarding a set of one or more precoding matrices; and
a processor configured to:
determine a first utility value for a first set of wireless devices served by the first access point based on restriction of the set of one or more precoding matrices;
determine a second utility value for a second set of wireless devices served by a second access point based on use of the set of one or more precoding matrices;
compare the first utility value to the second utility value;
grant restriction of use of the set of one or more precoding matrices by the first access point based on the comparison;
identify a conflict with a third access point based on the granting restriction of use of the set of one or more precoding matrices by the first access point; and
resolve the conflict by evaluating utility values for the first access point, the second access point, and the third access point.

10. The first access point of claim 9, wherein the information comprises a restriction request.

11. The first access point of claim 9, wherein resolving the conflict comprises identifying no conflicts in restriction.

12. The first access point of claim 9, wherein the processor is further configured to schedule the first access point to transmit data during a next transmit time interval, in response to resolving the conflict.

13. The first access point of claim 9, wherein the processor is further configured to allocate a physical resource block to at least one of the first set of wireless devices.

14. The first access point of claim 9, wherein the processor is further configured to exchange scheduling information with at least one of the second access point and the third access point.

15. The first access point of claim 9, wherein granting restriction is based on the comparison between the first utility value and the second utility value.

16. The first access point of claim 9, wherein the processor is further configured to reject restriction of use of another set of one or more precoding matrices by the first access point based on another comparison.

17. A first access point for coordinated scheduling in a wireless communication system, the first access point comprising:
    means for receiving information regarding a set of one or more precoding matrices;
    means for determining a first utility value for a first set of wireless devices served by a first access point based on restriction of the set of one or more precoding matrices;
    means for determining a second utility value for a second set of wireless devices served by a second access point based on use of the set of one or more precoding matrices;
    means for comparing the first utility value to the second utility value;
    means for granting restriction of use of the set of one or more precoding matrices by the first access point based on the comparison;
    means for identifying a conflict with a third access point based on the granting restriction of use of the set of one or more precoding matrices by the first access point; and
    means for resolving the conflict by evaluating utility values for the first access point, the second access point, and the third access point.

18. The first access point of claim 17, wherein the information comprises a restriction request.

19. The first access point of claim 17, wherein resolving the conflict comprises identifying no conflicts in restriction.

20. The first access point of claim 17, further comprising means for scheduling the first access point to transmit data during a next transmit time interval, in response to resolving the conflict.

21. The first access point of claim 17, further comprising means for allocating a physical resource block to at least one of the first set of wireless devices.

22. The first access point of claim 17, further comprising means for exchanging scheduling information with at least one of the second access point and the third access point.

23. The first access point of claim 17, wherein granting restriction is based on the comparison between the first utility value and the second utility value.

24. The first access point of claim 17, further comprising means for rejecting restriction of use of another set of one or more precoding matrices by the first access point based on another comparison.

25. A computer program product comprising a non-transitory computer-readable medium, the non-transitory computer readable medium comprising:
    code for causing a computer to receive information regarding a set of one or more precoding matrices;
    code for causing a computer to determine a first utility value for a first set of wireless devices served by a first access point based on restriction of the set of one or more precoding matrices;
    code for causing a computer to determine a second utility value for a second set of wireless devices served by a second access point based on use of the set of one or more precoding matrices;
    code for causing a computer to compare the first utility value to the second utility value;
    code for causing a computer to grant restriction of use of the set of one or more precoding matrices by the first access point based on the comparison;
    code for causing a computer to identify a conflict with a third access point based on the granting restriction of use of the set of one or more precoding matrices by the first access point; and
    code for causing a computer to resolve the conflict by evaluating utility values for the first access point, the second access point, and the third access point.

26. The computer program product of claim 25, wherein the information comprises a restriction request.

27. The computer program product of claim 25, wherein resolving the conflict comprises identifying no conflicts in restriction.

28. The computer program product of claim 25, wherein the computer-readable medium further comprises code for causing a computer to schedule the first access point to transmit data during a next transmit time interval, in response to resolving the conflict.

29. The computer program product of claim 25, wherein the computer-readable medium further comprises code for causing a computer to allocate a physical resource block to at least one of the first set of wireless devices.

30. The computer program product of claim 25, wherein the computer-readable medium further comprises code for causing a computer to exchange scheduling information with at least one of the second access point and the third access point.

31. The computer program product of claim 25, wherein granting restriction is based on the comparison between the first utility value and the second utility value.

32. The computer program product of claim 25, wherein the computer-readable medium further comprises code for causing a computer to reject restriction of use of another set of one or more precoding matrices by the first access point based on another comparison.

* * * * *